2,988,641
PRODUCTION OF SHEET MATERIALS
Sidney Walter Gough, Sutton Coldfield, England, assignor to Dunlop Rubber Company Limited, London County, England, a British company
Filed Jan. 21, 1958, Ser. No. 710,343
Claims priority, application Great Britain Jan. 28, 1957
8 Claims. (Cl. 250—83.6)

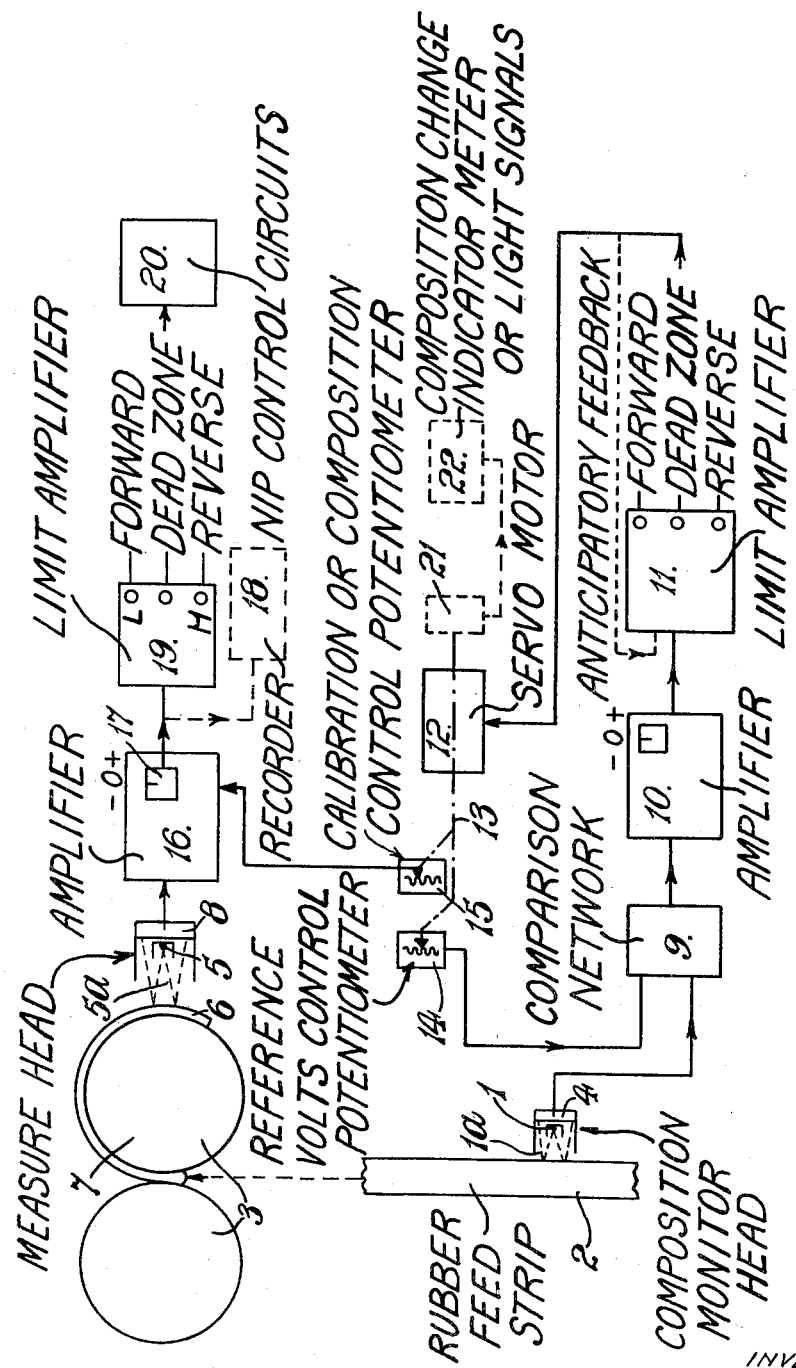

This invention is concerned with improvements in or relating to the production of sheet material and is particularly concerned with apparatus for determining the weight per unit area or for detecting variations from a pre-determined value of the weight per unit area of sheet materials and with apparatus for controlling sheet material producing apparatus.

In the process for the manufacture of a continuous sheet, e.g. of rubber, comprising the operation of passing the rubber between the bowls of a calender in order to give it the required thickness, it is necessary to have means for continuously determining the weight per unit area of the material processed, whilst this is on the bowl.

For this purpose various apparatus have been designed in which the weight measurement is based on the measurement of the thickness of the material on the bowl. In most of these apparatus, however, the thickness is measured with respect to a point of reference integral with the calender frame, and thus there is no compensation for the effect of relative movement, other than true rotation, between the bowl and the machine frame. This movement is due to the clearance of the bowl shaft in its bearings, which during the service life of the calender, increases continuously.

Although these measuring apparatus themselves can be made to operate sufficiently accurately, the said movement of the bowl is of such order of magnitude as to make the measurement unreliable when thin sheets or films are to be produced.

In other apparatus measuring the film thickness and not working on the above principle, the measurement is based on the relative position of two small wheels, one of which rests lightly on and rolls on the material on the bowl, whilst the other one is spring-loaded to make sure that it cuts through the said material and runs on the outer surface of the bowl. However, the load on this wheel causes wear of the bowl, which again makes the measurement unreliable, whilst a decrease of said load introduces uncertainty as to whether or not the wheel is in contact with the bowl surface. Furthermore there is the risk of the first wheel making an impression in the said material, thus upsetting the measurement.

It has been suggested, in order to be independent of relative movement or wear of the steel bowl, to utilise a "backscatter beta-ray gauge" for measuring the weight per unit area of a thin rubber film which broadly works on the following lines:

A source of beta-radiation is positioned close to the bowl in such a way that beta-rays radiate onto, and penetrate into, the rubber on said bowl. A part of these beta-rays is scattered through large angles in such a way that they emerge again on the same side at which they entered. The scattering effect is caused by collision of the beta-particles with atoms of the material penetrated. A further part of the beta-rays is reflected from the surface of the steel calender bowl since the material of the bowl has a considerably great resistance to penetration by beta-rays than the rubber material on the bowl. Apart from the intensity of the radiation source and the material of the bowl, the amount of beta-particles back-scattered and reflected is a function of both weight per unit area of said material and also on the "composition factor", which depends on the atomic numbers and the atomic weights of the atoms of the composition and the relative proportions of the individual atoms of the composition.

An ionisation chamber is positioned in such a way, that it receives a large percentage of the particles which are scattered back and reflected, and the ionisation current measured gives an indication of the weight of the material processed. It is, however, necessary, to have knowledge of the composition factor of the said material in order to translate the current reading into the actual weight per unit area. This value may be determined by experiment for each particular composition.

A disadvantage of this method is that it cannot be employed successfully when unintentional variations in the composition occur.

It is known that, for any specific material or composition of material to be measured, the ionisation current passing through the ionisation chamber remains at a constant value whatever the increase in thickness of material to be measured beyond a "saturation" weight per unit area, this saturation ionisation current being related to the composition factor of the material. Changes in the composition factor generally result in a change in the saturation ionisation current. It has been found that this phenomenon can be utilised in a method of determining the weight per unit area which will provide a continuous measurement despite continuous variations, intentional or otherwise, in weight per unit area or the composition factor of the material to be measured. It can also be utilised in apparatus for automatically maintaining at a substantially constant predetermined value the weight per unit area of sheet material produced.

It is an object of the invention, therefore, to provide apparatus of this kind.

According to the invention apparatus for determining the weight per unit area, or for detecting variations from a predetermined value of the weight per unit area, of sheet materials comprises a first source of beta- or gamma-radiation to project a beam of radiation onto a portion of material of "saturation" weight or greater than "saturation" weight, a first detecting means responsive to variation in the intensity of radiation back-scattered by said portion which is caused by variation in the composition of the material, a second source of beta- or gamma-radiation to project a beam of radiation onto a portion of the material of less than saturation weight, a second detecting means responsive to variation in the intensity of radiation back-scattered or transmitted by said portion which is caused by variation in the weight per unit area or composition of the material, and measuring means for indicating the weight per unit area or variations from a predetermined value of weight per unit area operated by the two detecting means wherein the output from the second detecting means is compensated by the output from the first detecting means for variations in the composition of the said material.

The apparatus may comprise a network for comparing the voltage representing the output from the first detecting means with an adjustable reference voltage to obtain a positive or negative difference voltage, means for rotating a motor in one direction or the other according to the sense of the difference voltage, means actuated by the motor and electrically connected to a circuit incorporating the second detecting means to compensate for variations in the output of the second detecting means due to variation in the composition of the material, and means simultaneously actuated by the motor for varying the adjustable reference voltage to reduce the difference voltage and stop rotation of the motor.

Further, according to the invention apparatus for automatically maintaining at a substantially constant predetermined value the weight per unit area of sheet material produced comprises apparatus of the above-mentioned kind wherein the electrical means for indicating the weight per unit area is replaced by or supplemented by means operated by the two detecting means for adjusting an apparatus producing the sheet material whereby, upon increase or decrease of the weight per unit area of the sheet material being produced beyond predetermined limits, the sheet producing apparatus is adjusted so as to decrease or increase respectively the weight per unit area and maintain the weight per unit area within those limits.

The choice between beta and gamma radiation is governed by the need of finding a radiation, whose range or penetrating power is greater than and preferably considerably greater than that required to penetrate the film thickness, but less than that required to penetrate the backing plus film thickness.

The radiation source located adjacent to the portion of the sheet the weight per unit area of which is to be measured, may be placed either on the same side as, or on the opposite side to, the detecting means.

One embodiment of the invention will now be described by way of example.

A source 1 of radiation, strontium 90, is located at a distance of about ⅝" from the surface of a strip 2 of rubber of about ⅜" thickness or about 250 ozs. per square yard, the strip being supplied from a warming mill (not illustrated) to the bowls of a calender 3 for the manufacture of thin rubber sheet. The source is disposed so that the radiation 1a therefrom is back-scattered from the surface of the strip to an ionisation chamber 4 located co-axially in a position alongside the source shielded therefrom and about ⅝" from the surface of the rubber strip. Variation in the output of the ionisation chamber 4 is caused by variation in the composition of the material.

A second source 5 of beta-radiation, also strontium 90, is mounted at a distance of about ⅝" from the surface of a thin sheet of rubber 6, of about 20 ozs. per square yard, located on a steel bowl 7 of the calender 3. The source is positioned so that the radiation 5a therefrom is back-scattered from the surface of the sheet upon the bowl and also reflected from the bowl surface to an ionisation chamber 8 located so as to receive the majority of the back-scattered rays at a position also about ⅝" from the surface of the rubber sheet. Variation in the output of the ionisation chamber 8 is caused by variation in the weight per unit area or composition of the material.

The output from the ionisation chamber 4 is fed to an electrical network for comparing this output voltage with an adjustable reference voltage said network comprising a comparison network 9 which feeds an amplifier 10 and a limit amplifier 11. The limit amplifier 11 gives either a positive or negative signal according to whether a voltage resulting from the output from the ionisation chamber 4 is greater or less than the adjustable reference voltage. This signal is utilised to operate a servo-motor 12 in forward or reverse.

The servo-motor 12 is mechanically connected by the shaft 13 to two potentiometers 14 and 15, potentiometer 14 being connected in an electrical circuit to provide the said adjustable reference voltage and the potentiometer 15 being a composition control potentiometer connected in circuit with an amplifier 16 for amplifying the output from the ionisation chamber 8 associated with the second source 5, adjustment of the composition control potentiometer compensating for changes in the composition factor of the material of the sheet as will be more particularly described. An electrical measuring instrument 17, calibrated so as to indicate variations from a predetermined value of ounces of rubber sheet per square yard, is connected to the output of the amplifier associated with the second source and a recording instrument 18, for recording this value may also be provided as shown by dotted lines.

A limit amplifier 19 is connected to the output of the amplifier 16 and provides a positive or a negative signal according to whether the weight per unit area of the sheet material is above or below certain predetermined limits. Nip control circuits 20 are provided, actuated by the signal from the limit amplifier 19, which operate electric motors driving adjusting screws (these are not illustrated) for adjusting the value of the nip of the calender rolls and cause the weight per unit area of the sheet material to be brought within the predetermined limits.

A composition change meter indicator 21 and light signals 22 for indicating a composition may be provided, as shown by dotted lines, these each being operated by rotation of the motor 12.

During the operation of the apparatus, the rubber sheet 6 passing over the calender bowl 7 passes between the bowl and the second source 5 of radiation. Some part of the radiation 5a emitted is scattered and its energy absorbed within the rubber sheet and some part of the radiation is scattered back from the surface of or within the sheet, to be detected by the associated ionisation chamber 8. In addition, some other part of the radiation emitted passes through the rubber sheet 6 and is reflected from the surface of the steel calender bowl 7, reflection taking place from the bowl since the material steel, having a much higher atomic number than the material to be measured, will be considerably more resistant to penetration by the beta-radiation. Some of the reflected radiation passes back through the rubber sheet 6 and is detected by the ionisation chamber which is thus affected by both back-scattered radiation and reflected radiation.

A current is caused to flow through the ionisation chamber 8 and a reading is obtained on the measuring instrument 17 which would be dependent, but for the operation of the first source, upon both the composition factor and the weight per unit area of the rubber sheet upon the calender bowl.

The radiation 1a emitted from the first source 1 of radiation, located adjacent to the thick strip 2 of rubber being supplied to the calender 3, is scattered by the sheet, some of the energy being absorbed by the sheet and some being scattered back and detected by the ionisation chamber 4. In view of the fact that the weight of this sheet is greater than the "saturation" weight of the composition of the rubber sheet, the current flowing through the ionisation chamber is proportional to the composition factor.

The output from the ionisation chamber 4 passed to the comparison network 9, the amplifier 10 and the limit amplifier 11 as described later. When a change in the composition factor of the material of the strip 2 takes place, a positive or negative signal is provided by the limit amplifier 11 and this operates the servo-motor 12 to cause it to adjust the composition control potentiometer 15. Simultaneously, the servo-motor operates the potentiometer 14 controlling the adjustable reference voltage to increase or decrease the reference voltage in order that the servo-motor shall be stopped when the difference between the reference voltage and a voltage resulting from the ionisation chamber 4 is substantially zero.

The effective resistance of the composition control potentiometer 15 is dependent upon the composition factor of the material being measured.

The potentiometer 15 is connected in circuit with the amplifier 16 and the adjustment of the potentiometer 15 by the servo-motor compensates the output from the ionisation chamber 8, amplified by the amplifier 16, for variation in the composition of the strip 2.

The compensated output from the amplifier 16 passes to the measuring instrument 17 and recorder 18 to provide a correct indication of weight per unit area.

If the weight per unit area increases or decreases above certain predetermined values the limit amplifier 19, fed from the amplifier 16, automatically provides an appropriate signal. The signal operates electric motors driving the adjusting screws and adjusts them so that the nip of the calender is corrected and a sheet issues therefrom having a weight per unit area within the predetermined values.

The radiation source located adjacent to the portion of the sheet to be measured may, in an alternative arrangement to that just described, be located on the opposite side of the sheet to the ionisation chamber, the operation and construction of the apparatus being otherwise the same.

Although the first and second sources of radiation in the embodiment described are of the same material, this is not essential. Indeed the sources may be of the same material or of different materials and of the same or of different intensities of radiation.

The first source, in the embodiment described, operates so as to compensate the reading on the measuring instrument associated with the second source to allow for variation in the composition factor of the rubber composition. This first source, however, may be utilised to compensate any number of measuring instruments operating to measure the thickness of rubber sheet, e.g. measuring instruments and associated sources and ionisation chambers may be located at each end of a calender bowl and in the case where a sheet of weftless cotton cords are to be rubberised on each side on a four bowl calender, two calender bowls may have pairs of measuring instruments so associated.

It is an advantage of apparatus according to this invention that even though a large number of measuring instruments are used in conjunction with a single machine, as just described, the apparatus is not unduly bulky, only one source being required for the compensation of all the measuring instruments. This source is located separately, and often can be located remotely, from the sources required directly for weight per unit area measurement.

With beta-ray sources at present available, i.e. strontium and thallium, rubber weights of up to 50 ozs. per square yard can be measured by means of the apparatus in accordance with the invention, but it is possible to measure weight of up to 30 ozs. per square yard more accurately.

The "saturation" weight of most rubber compositions utilising these sources is 80 ozs. per square yard, but this weight varies according to the composition under consideration. Care must be taken to ensure that the saturation weight is well exceeded in the portion of the material associated with the source used for compensating the weight per unit area measuring instrument.

Other materials than rubber can be measured by means of apparatus according to the invention, e.g. plastic sheet materials such as polyvinylchloride compositions or polythene.

Although ionisation chambers have been referred to as suitable detecting means, other means such as a photomultiplier or a Geiger tube or a photoconductive cell made up, for example, of calcium sulphide crystals, may be used.

A considerable advantage of the apparatus according to the invention is that, between limits, it is substantially insensitive to variations in the distance between the emitter or the ionisation chamber and the surface of the sheet. In the embodiment described these limits cover a range of at least $1/16''$, so that the floating movement of the calender bowl referred to before does not substantially affect the result of the measurement.

Having now described my invention, what I claim is:

1. Apparatus for determining variations in the weight per unit area of sheet material in process of manufacture which comprises a first source of radiation of the class consisting of beta- and gamma-radiation positioned to project a beam of said radiation onto a portion of material prior to calendering it to a thickness below that at which back scattering does not increase with increasing thickness for a given composition, a first detecting means positioned to receive radiation back scattered from said portion to produce an electric potential responsive to the intensity of said back scattered radiation, a second source of radiation of the class consisting of beta- and gamma-radiation positioned to project a beam of said radiation to a portion of said material which has passed said first source of radiation and has been calendered, a second detecting means positioned to receive radiation from said calendered portion of said material to produce an electric potential responsive to the intensity of radiation back scattered to said means, and a measuring means to compensate the potential of said first detecting means by the potential of said second detecting means and to indicate said compensated potential in terms equivalent to the weight per unit area of said calendered material.

2. Apparatus according to claim 1 in which the means for compensating the output from the second detecting means comprises a network for comparing the potential representing the output from the first detecting means with an adjustable reference potential to obtain a positive or negative potential difference, means for rotating a motor in one direction or the other according to the sense of the potential difference, means actuated by the motor and electrically connected to a circuit incorporating the second detecting means to compensate for variations in the output of the second detecting means due to variations in the composition of the material, and means simultaneously actuated by the motor for varying the adjustable reference voltage to reduce the potential difference and stop rotation of the motor.

3. Apparatus according to claim 1 wherein the detecting means for each source comprises an ionization chamber.

4. Apparatus according to claim 1 wherein both of the sources of radiation are of strontium 90.

5. Apparatus according to claim 1 wherein the first and second detecting means are each located adjacent to a separate associated source of radiation, each detecting means being positioned so as to be capable of receiving radiation from its associated source back-scattered from the sheet material and metallic means being provided for supporting material in position adjacent to the second source and for reflecting radiation therefrom to the second detecting means.

6. Apparatus according to claim 1 having electrical means responsive to the output from the first detecting means for measuring the composition factor of the material.

7. Apparatus for automatically maintaining at a substantially constant predetermined value the weight per unit area of sheet material produced comprising apparatus in accordance with claim 1 comprising an apparatus producing the sheet material, a control operated by the two detecting means for adjusting said apparatus whereby, upon increase or decrease of the weight per unit area of the sheet material being produced beyond predetermined limits, the sheet producing apparatus is adjustable by said control so as to decrease or increase respectively the weight per unit area and maintain the weight per unit area within those limits.

8. Apparatus for determining variations from a predetermined value of the weight per unit area of sheet material comprising two radiation sources, selected from the class consisting of beta- and gamma-radiation sources, and two radiation detecting means, the first of the two sources being positioned so as to direct radiation onto a portion of the material of at least saturation weight per unit area, one of the detecting means being positioned so as to detect variations in the radiation from the said source back-scattered from said portion of the material to determine variations in the composition factor thereof, and the second of the two sources being positioned so as to direct radiation onto a second portion of the sheet material of less than "saturation" weight per unit area, a second detecting means being positioned so as to detect variations in the radiation from said second source back-scattered from said second portion of the sheet material to determine variations in both the weight per unit area and the composition factor thereof, and means for combining the outputs of the two detecting means wherein the output from the second detecting means is compensated for variations in the composition of the said material by the output from the first detecting means.

References Cited in the file of this patent

UNITED STATES PATENTS

| | | |
|---|---|---|
| 2,264,725 | Shoupp | Dec. 2, 1941 |
| 2,304,910 | Hare | Dec. 15, 1942 |
| 2,549,176 | Crumrine | Apr. 17, 1951 |
| 2,687,052 | Zeitlin | Aug. 24, 1954 |
| 2,750,986 | Russell | June 19, 1956 |

OTHER REFERENCES

Putman: "Development in Thickness Gauges and Allied Instruments," International Conference on Peaceful Uses of Atomic Energy, vol. 15, pages 119–123 (United Nations), August 1955.

Crompton, "Versatility of Radiation Applications Involving Penetration or Reflection," International Conference on Peaceful Uses of Atomic Energy, vol. 15, pages 124–134 (United Nations), August 1955.